(No Model.) 2 Sheets—Sheet 1.
W. E. ELLIOTT.
ANTI-FRICTION JOURNAL BEARING.
No. 438,576. Patented Oct. 14, 1890.
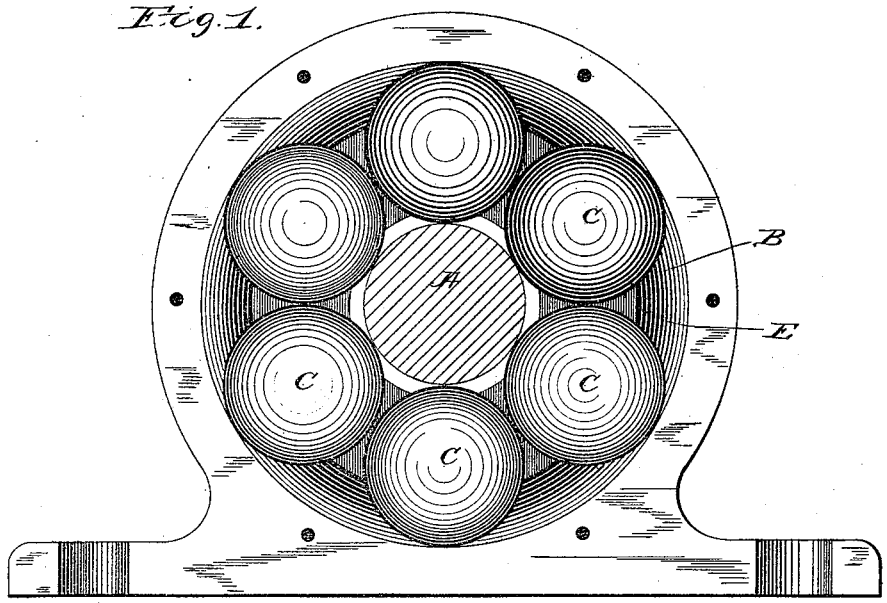
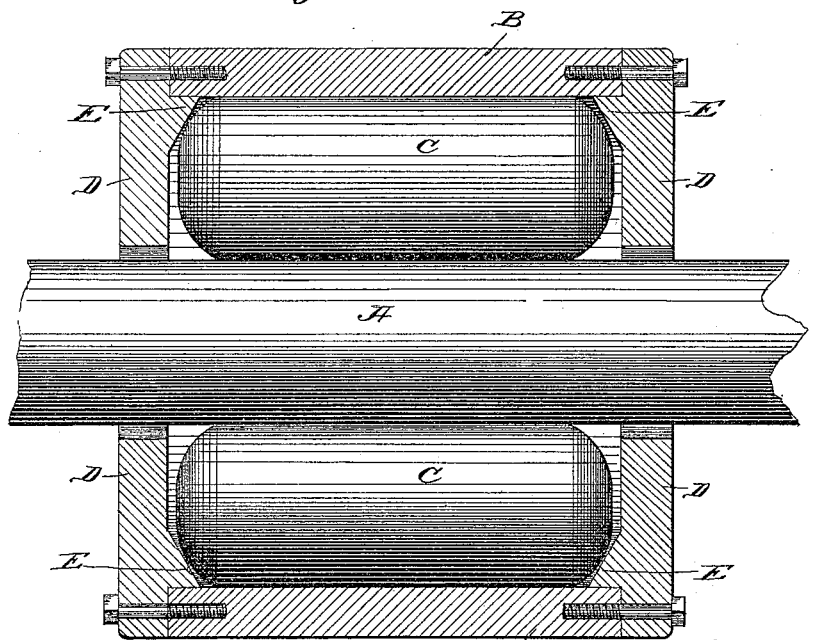
Witnesses.
Wm. J. Rheem
D. R. Omohundro
Inventor:
William E. Elliott
By Jno. G. Elliott
Atty.
THE NORRIS PETERS CO., PHOTO-LITHO., WASHINGTON, D. C.

(No Model.) 2 Sheets—Sheet 2.
W. E. ELLIOTT.
ANTI-FRICTION JOURNAL BEARING.
No. 438,576. Patented Oct. 14, 1890.
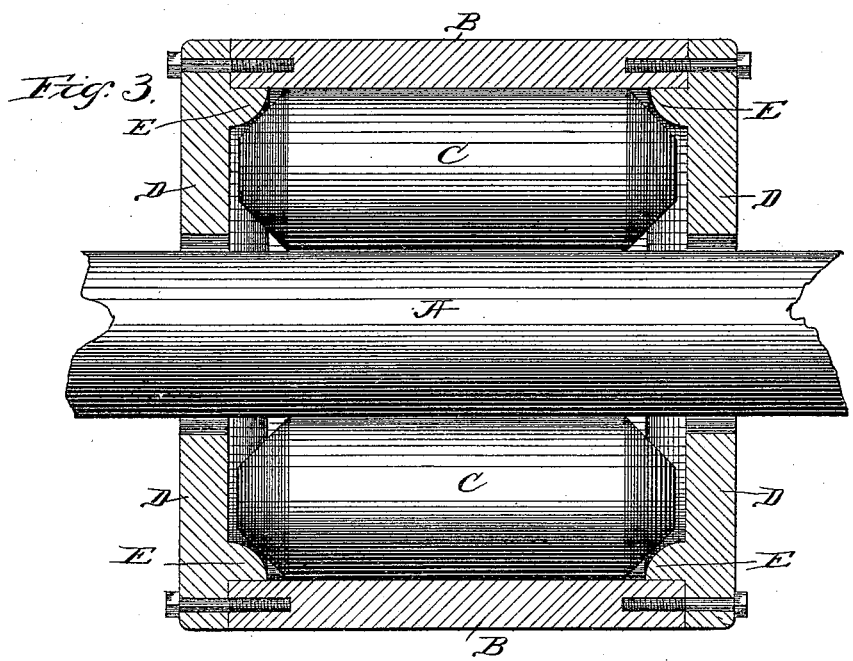
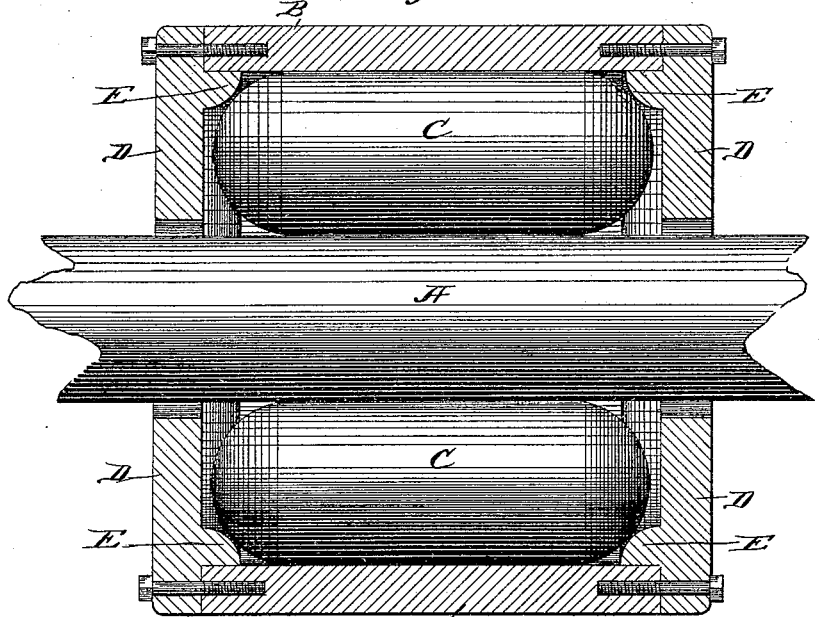
Witnesses.
Wm R Rheem
H. B. Onohundro
Inventor.
William E. Elliott
By Jno. G. Elliott
Atty.

UNITED STATES PATENT OFFICE.

WILLIAM E. ELLIOTT, OF CHICAGO, ILLINOIS.

ANTI-FRICTION JOURNAL-BEARING.

SPECIFICATION forming part of Letters Patent No. 438,576, dated October 14, 1890.

Application filed October 15, 1888. Serial No. 288,120. (No model.)

*To all whom it may concern:*

Be it known that I, WILLIAM E. ELLIOTT, of the city of Chicago, county of Cook, and State of Illinois, have invented certain new and useful Improvements in Anti-Friction Journal-Bearings, of which the following is a specification.

This invention relates to improvements in anti-friction journal-bearings in which heretofore the end thrust or movement of the anti-friction cylinders has been prevented by having the ends of the cylinders beveled and bearing against corresponding inclined bearings on the ends of the casing, or else rounded or convexed and bearing against a corresponding concave bearing upon the ends of the casing, in both of which devices, however, the entire beveled or curved bearing-surface of the roller bears upon and is therefore in frictional contact with the bearings on the casing; and while devices thus made prevent an endwise movement of the rollers, they do not materially reduce the friction between the roller and the casing, because of the line of contact therebetween, and besides which in a short time, by reason of the grinding effect produced by such a bearing, they soon become useless for the intended purpose.

The object of this invention is to reduce to the minimum the frictional area of the contacting surfaces on the ends of the cylinders and casing and at the same time promote the efficiency of such bearings in preventing an end thrust or movement of the anti-friction cylinders. I attain these objects by the devices illustrated in the accompanying drawings, in which—

Figure 1 represents an end view of an anti-friction journal-bearing with an end of the casing removed and showing a single set of anti-friction cylinders; Fig. 2, a central vertical section thereof, showing the anti-friction rollers in elevation and provided with rounded ends and the casing provided with an inclined bearing; Fig. 3, a similar view showing the location of the bearing-surfaces reversed—that is, the ends of the cylinders beveled and the bearing-surface on the casing rounded; Fig. 4, a similar view in which both the ends of the cylinders and their bearings on the casing are shown as rounded or convexed.

Similar letters of reference indicate the same parts in the several figures of the drawings.

Referring by letter to the accompanying drawings, A indicates a journal, and B a casing, between which is confined a series of journal-bearing cylinders C, bearing upon the journal and casing, which latter for convenience is provided with removable ends D, upon which are cast or otherwise formed inclined bearings E, against which bear the rounded ends of the journal-bearing cylinders, which are thereby prevented from having an endwise movement within the casing, except a very slight play, which is permitted in order to avoid the constant bearing of the ends thereof upon the inclines.

The opposing end bearing-surfaces of the cylinders and casing are of such a character as to have the minimum frictional area between the contacting surfaces thereof—a most potent element in avoiding friction in devices of this class, there being in fact merely a point of contact between the end of the cylinder and the opposing bearing-surfaces in contradistinction to the line of contact which exists where two beveled surfaces or a convex and concave surface are opposed to each other.

The construction just described—that is, the rollers with rounded ends and the inclined bearing on the casing—is illustrated in Figs. 1 and 2 of the drawings; but in carrying out the object of my invention, the essential feature of which is the reduction to the minimum of the frictional area of the contacting surfaces between the ends of the rollers and casing, it is immaterial whether the opposing end bearing-surfaces of the casing are arranged as shown in those figures or whether their location is reversed—that is to say, the end of the roller inclined or beveled and the bearing on the casing rounded, as shown in Fig. 3—for the result would be the same in either case, and in so far as attaining the end of my invention is concerned it would be no departure from the spirit of my invention to have both the end of the roller and the casing rounded, as shown in Fig. 4, for in this as in the other constructions previously described there would be merely a point of contact between the ends of the cylinders and the casing, and therefore the frictional area of the contacting surfaces of such devices would be reduced to the minimum. In this connection I would state that there has already been allowed me a claim covering the specific arrangement of two sets of rollers, in which the ends of the rollers were rounded and the bearings on the casing inclined, in my patent granted October 16, 1888, No. 391,234; but in the present application I do not desire to limit myself to any particular arrangement of the cylinders, whether provided with rounded or beveled ends, or to any particular location of the beveled or rounded bearing-surfaces, so long as one surface is curved and the other tangentially opposed thereto so as have a single point of contact.

Having described my invention, what I claim, and desire to secure by Letters Patent, is—

1. The combination of a series of journal-bearing cylinders and a box therefor, said box and cylinders having end bearing-surfaces opposing each other, one of which surfaces is curved and the other extends tangentially thereto aside from the axes of the cylinder, substantially as described.

2. The combination of a series of journal-bearing cylinders and a box therefor, said box and cylinders having end bearing-surfaces opposing each other, one of which surfaces is curved and the other inclined, substantially as described.

3. The combination of a series of journal-bearing cylinders and a box therefor, said box having the inclined bearing and the cylinders a curved bearing opposing said inclined bearing, substantially as described.

WILLIAM E. ELLIOTT.

Witnesses:
W. R. OMOHUNDRO,
A. M. BENNETT.